US012698434B1

(12) United States Patent
Castel et al.

(10) Patent No.: US 12,698,434 B1
(45) Date of Patent: Aug. 4, 2026

(54) COMBINATION OF POLYGLYCEROL-10 LAURATE AND AN ALCOHOL TO REVERSE THE ROCK WETTABILITY OF A RESERVOIR

(71) Applicant: OLEON NV, Evergem (BE)

(72) Inventors: Alys Castel, Margny-lès-compiègne (FR); Julien Deligny, Venette (FR); Pieter Struelens, Gooik (BE)

(73) Assignee: OLEON NV, Evergem (BE)

( * ) Notice: Subject to any disclaimer, the term of this patent is extended or adjusted under 35 U.S.C. 154(b) by 0 days.

(21) Appl. No.: 19/247,924

(22) Filed: Jun. 24, 2025

(51) Int. Cl.

| | |
|---|---|
| ***C09K 8/584*** | (2006.01) |
| ***C09K 8/60*** | (2006.01) |
| ***C09K 8/68*** | (2006.01) |
| ***C11D 1/74*** | (2006.01) |
| ***E21B 43/16*** | (2006.01) |

(52) U.S. Cl.
CPC .............. *C09K 8/584* (2013.01); *C09K 8/604* (2013.01); *C09K 8/68* (2013.01); *C11D 1/74* (2013.01); *E21B 43/16* (2013.01); *C09K 2208/30* (2013.01)

(58) Field of Classification Search
None
See application file for complete search history.

(56) References Cited

U.S. PATENT DOCUMENTS

| | | | | |
|---|---|---|---|---|
| 12,359,114 | B2 * | 7/2025 | Castel | C09K 8/602 |
| 2006/0275218 | A1 * | 12/2006 | Tamarkin | A61P 23/02 424/539 |
| 2008/0003185 | A1 * | 1/2008 | Valpey | C11B 9/00 516/8 |
| 2023/0247989 | A1 * | 8/2023 | Clarke | A01N 25/30 514/552 |
| 2023/0263717 | A1 * | 8/2023 | Kwan | A61K 8/39 510/130 |

* cited by examiner

*Primary Examiner* — Andrew Sue-Ako
(74) *Attorney, Agent, or Firm* — ArentFox Schiff LLP

(57) ABSTRACT

The present disclosure relates to a combination of polyglycerol-10 laurate and an alcohol, a fluid comprising it, and a method for releasing the oil from an oil reservoir.

10 Claims, No Drawings

COMBINATION OF POLYGLYCEROL-10 LAURATE AND AN ALCOHOL TO REVERSE THE ROCK WETTABILITY OF A RESERVOIR

The present disclosure relates to an environment friendly combination and its ability to reverse the rock surface wettability of oil reservoirs from oil-wet to water-wet to improve oil recovery.

Rock surface wettability refers to the preferential adherence and spread of a fluid to a rock surface in the presence of another immiscible fluid. This phenomenon is driven by a combination of adhesive and cohesive forces (Anderson W. G, J. Pet. Technol., 38 (10), 1125-1144, 1986).

In this tripartite system comprising water, oil, and rock, the wettability determines the tendency of an oil drop to spread over the rock surface (Wettability of Shale/Oil/Brine Systems: A New Physicochemical and Imaging Approach, Fathy et al., International Petroleum Technology Conference, Riyadh, 2022). This parameter is usually evaluated by contact angle measurement (Leon-Pabon et al., CT&F—Ciencia, Tecnologia y Futuro, 5 (5), 5-22, 2014).

Oil reservoirs are oil-wet (hydrophobic) character reservoirs, meaning that the oil preferably adheres and spreads on the formation pore surface of the reservoirs. In this condition, water alone cannot easily displace the oil.

Indeed, the fluids injected in the reservoir are more often water-based fluids that are preferred to oil-based fluids to avoid injecting large volume of oil in the nature.

Therefore, the wettability of oil reservoirs need to be transformed from oil-wet (hydrophobic) to water wet (hydrophilic).

Wettability alteration can be chemically achieved using a suitable surfactant. Thus, water rather than oil adheres preferentially to the formation pore surface of the reservoir. Water can then displace more easily the oil from the reservoir, the oil no longer adhering on the formation pore surface.

By changing the wettability of the formation pore surface of a reservoir, e.g. changing the oil-wet character of the formation pore surface of the reservoir to water-wet, spontaneous imbibition of water occurs, enabling the oil to flow through the wellbore, thus increasing the quantity of hydrocarbons that can be extracted.

Different surfactants are described in the literature (Surfactants employed in conventional and unconventional reservoirs for enhanced oil recovery-A review; O. T. Isaac et al., Energy Reports, Vol. 8, 2022, pp. 2806-2830):

- anionic surfactants, such as alkyl sulfonates, sulfosuccinates or sulphates;
- nonionic surfactants, such as linear or branched alkoxylated alcohols or alkoxylated phenols;
- cationic surfactants, such as ammonium salts.

The patent application US2021/0095184, hereby incorporated by reference in its entirety, discloses a fluid for treating unconventional reservoirs, said fluid comprising an anionic surfactant package which preferably comprises a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof.

The patent U.S. Pat. No. 10,640,698, hereby incorporated by reference in its entirety, discloses methods for treating subterranean using a treatment fluid comprising an aqueous base fluid and a surfactant comprising an ethoxylated amine or derivative thereof.

The patent U.S. Pat. No. 11,566,169, hereby incorporated by reference in its entirety, describes a well treatment fluid for treating oil-wet formations, comprising a wettability modifier, which includes an alkylamine oxide surfactant, and an organic compound having a phosphonoalkyl moiety.

However, some surfactants may present environmental, health, and safety concerns.

The work of the inventors has shown that a specific combination of a polyglycerol-10 fatty acid ester and an alcohol, could not only reverse the rock surface wettability but could also improve the compatibility with additives in a saline fluid.

The disclosure relates thus to a combination consisting of:

50-99 wt % of polyglycerol-10 laurate; and 1-50 wt % of an alcohol of Formula (I):

(I)

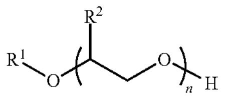

wherein:

$R^1$ and $R^2$, identical or different, each represents a hydrogen atom or a saturated, linear or branched, alkyl group comprising from 1 to 4 carbon atoms; and n is an integer comprised between 1 and 10;

weight percentages being based on the weight of the combination.

In the present application, unless otherwise indicated, all ranges of values used are to be understood as being inclusive limits.

The polyglycerol-10 laurate (PG10-C12) is obtainable by a process comprising an esterification reaction between polyglycerol-10 and lauric acid.

Polyglycerol-10 (PG-10) is obtainable by an oligomerization reaction of glycerol. The oligomerization reaction is preferably carried out at a temperature comprised between 180° and 280° C., optionally in the presence of a catalyst, such as sodium hydroxide, potassium hydroxide or lithium hydroxide. The oligomerization reaction is preferably conducted until the refractive index reaches a value comprised between 1.4898 and 1.4928 at 60° C. at atmospheric pressure, such as 1.4915 at 60° C. at atmospheric pressure.

In the present application, unless otherwise indicated, the refractive index is measured according to the standard ASTM D1218.

The integer following the polyglycerol (PG) represents the average number of glycerol units forming the polyglycerol.

The esterification reaction of the polyglycerol-10 with lauric acid to obtain the polyglycerol-10 laurate is preferably carried out at a temperature between 150° and 250° C. A catalyst may be used to speed the reaction, such as para-toluene sulfonic acid, methane sulfonic acid, hydrogen chloride or sulfuric acid. The esterification reaction is preferably conducted until the acid value is of at most 1 mg KOH/g.

In the combination according to the disclosure, the polyglycerol-10 laurate has preferably an acid value between 0 and 1 mg KOH/g.

In the combination according to the disclosure, the polyglycerol-10 laurate has preferably a hydroxyl value between 150 and 800, more preferably between 200 and 700 mg KOH/g.

In the present application, unless otherwise indicated:

acid value is measured according to the standard AOCS Cd 3D-63;

hydroxyl value is measured according to the method OA-081.

As illustrated in Example 4.3.a., polyglycerol-10 laurate in a brine can reverse the wettability of a rock from oil-wet to water-wet. On the opposite, polyglycerol-6 laurate has no effect on the wettability of the rock.

Advantageously, in the combination according to the disclosure, the alcohol of Formula (I), $R^2$ represents a hydrogen atom or a methyl group.

Advantageously, in the combination according to the disclosure, the alcohol of Formula (I), $R^1$ represents a hydrogen atom or a butyl group.

Advantageously, in the combination according to the disclosure, the alcohol of Formula (I) is selected from the group consisting of polyethylene glycol 400, monopropylene glycol, and/or butyl glycol.

Butyl glycol is also named 2-butoxyethanol.

Preferably, the alcohol of Formula (I) is selected from the group consisting of monopropylene glycol and/or polyethylene glycol 400. More preferably, the alcohol of Formula (I) is polyethylene glycol 400.

Preferably, the quantity of polyglycerol-10 laurate is comprised between 50 and 95, more preferably, between 50 and 90 wt %, even more preferably between 55 and 85 wt %, such as between 60 and 80 wt % based on the weight of the combination.

Preferably, the quantity of alcohol of Formula (I) is comprised between 5 and 50 wt %, more preferably between 10 and 50 wt %, even more preferably between 15 and 45 wt %, such as between 20 and 40 wt % based on the weight of the combination.

Advantageously, in the combination according to the disclosure, the polyglycerol-10 laurate represents 55-85 wt %, and the alcohol of Formula (I) represents 15-45 wt %, weight percentages being based on the weight of the combination.

Preferably, in the combination according to the disclosure, the polyglycerol-10 laurate represents 60-80 wt %, and the alcohol of Formula (I) represents 20-40 wt %, weight percentages being based on the weight of the combination.

A particularly preferred combination according to the disclosure, consists of:

60-80 wt % of polyglycerol-10 laurate; and 40-20 wt % of an alcohol of Formula (I);

wherein the alcohol of Formula (I) is selected from the group consisting of polyethylene glycol 400, monopropylene glycol, and/or n-butyl glycol.

The combination according to the disclosure is dispersible in brine comprising different salts at different contents at a temperature up to 80° C. (Example 4.1), lowers the interfacial tension of brine (Example 4.2), and is compatible with additives in saline conditions (Example 4.4). The resulting saline fluid comprising the combination according to the disclosure reverses the wettability of rocks from oil-wet to water-wet, as illustrated in Example 4.3.

The disclosure also relates to a fluid comprising:

at least 0.05 wt % of the combination according to the disclosure;

at least 97 wt % of brine; and optionally an additive;

weight percentages being based on the weight of the fluid.

Preferably, the quantity of the combination is of at most 3 wt %, more preferably of at most 2 wt % based on the weight of the fluid.

Preferably, the quantity of the combination is of at least 0.1 wt % based on the weight of the fluid.

Advantageously, in the fluid according to the disclosure, the combination according to the disclosure represents between 0.05 and 3 wt % of the weight of the fluid.

Preferably, the quantity of the combination is comprised between 0.05 and 2 wt %, even more preferably between 0.1 and 2 wt % based on the weight of the fluid.

The brine is a solution of mineral salt(s) in water.

The mineral salt(s) is preferably potassium chloride, sodium chloride, calcium chloride, magnesium chloride, sodium sulfate, sodium bicarbonate, potassium bromide, strontium chloride, sodium fluoride, calcium bromide, and/or sodium bromide.

Preferably, the quantity of the mineral salt is comprised between 1 and 30 wt % based on the weight of brine.

Preferably, the quantity of water is comprised between 70 and 99 wt % based on the weight of brine.

Preferably, the quantity of the brine is of at most 99.95 wt %, more preferably of at most 99.90 wt %, even more preferably of at most 99.50 wt % based on the weight of the fluid.

Preferably, the quantity of the brine is of at least 98 wt % based on the weight of the fluid.

Advantageously, in the fluid according to the disclosure, the fluid according to the disclosure, the brine represents between 97 and 99.95 wt % of the weight of the fluid.

Preferably, the quantity of the brine is comprised between 97 and 99.90 wt %, such as between 97 and 99.50 wt % based on the weight of the fluid.

Preferably, the fluid according to the disclosure further comprises an additive.

The additive is preferably chosen among additives usually used in oilfield.

Preferably, the additive is selected among the group consisting of viscosifiers, fluid loss control agents, dispersants, lubricating agents, surfactants others than polyglycerol-10 laurate, lost circulation materials, corrosion inhibitors, biocides, scale inhibitors, filtration control agents, friction reducers, breakers, iron control agents, cross-linkers, and mixtures thereof.

More preferably, the additive is selected among the group consisting of viscosifiers, surfactants others than polyglycerol-10 laurate, scale inhibitors, friction reducers, and mixtures thereof.

Even more preferably, the additive is selected among the group consisting of scale inhibitors, friction reducers, and mixtures thereof.

Preferably, the total quantity of additive present in the fluid according to the disclosure is comprised between 0.01 and 2 wt % based on the weight of the fluid.

By "total quantity of additive", it is intended to mean the quantity of all additives present in the fluid.

Advantageously, in the fluid according to the disclosure, the additive represents between 0.01 and 2 wt % of the weight of the fluid.

As illustrated in Examples, the fluid according to the disclosure, is homogeneous at temperatures up to 80° C., presents a low interfacial tension, remains homogeneous in presence of additives, and reverses the wettability of different rocks.

Thus, the fluid of the present disclosure may advantageously be a fluid which is introduced into a wellbore.

A preferred fluid to be introduced into a wellbore, comprises a viscosifier and/or a surfactant other than polyglycerol-10 laurate.

More particularly, the viscosifier is bentonite, xanthan gum, guar gum, a guar gum derivative, hydroxyethyl cellulose, and/or a hydroxy cellulose derivative.

Preferably, the fluid according to the disclosure is a fracturing fluid, a drilling fluid, a completion fluid, or a chemical or water flooding fluid.

In particular, in the fracturing fluid, the additives are chosen the group consisting of viscosifiers, surfactants others than polyglycerol-10 laurate, friction reducers, breakers, iron control agents, cross-linkers, and mixtures thereof.

More particularly, the friction reducer is a polyacrylamide and/or a polyacrylate.

More particularly, the breaker is a peroxide and/or an enzyme complex.

More particularly, the iron control agent is citric acid and/or ammonium chloride.

More particularly, the cross-linker is a borate salt, titanium, and/or zirconium.

In particular, in the drilling fluid, the additives are chosen the group consisting of viscosifiers, surfactants others than polyglycerol-10 laurate, fluid loss control agents, dispersants, lost circulation materials, and mixtures thereof.

More particularly, the fluid loss control agent is starch, carboxymethyl cellulose, and/or polyanionic cellulose.

More particularly, the dispersant is a lignosulfonate, a polyphosphate, and/or a tannin.

More particularly, the lost circulation material is a cellulose fiber, mica, and/or a ground walnut shell.

The disclosure also concerns a method for releasing the oil from an oil reservoir, comprising introducing the fluid according to the disclosure, through a wellbore into the said oil reservoir.

The disclosure is further described in the following examples. It will be appreciated that the disclosure as claimed is not intended to be limited in any way by these examples.

EXAMPLE 1: PREPARATION OF COMBINATIONS ACCORDING TO THE DISCLOSURE

1. Preparation of polyglycerol-10 laurate (PG10-C12)

a. Oligomerization Reaction of Glycerol to Form Polyglycerol-10 (PG10)

To prepare PG10, 99.9 wt % of glycerol (Glycerine 4813 from Oleon) and 0.1 wt % of sodium hydroxide solution at 10% (catalyst) were loaded into a reactor equipped with a distillation unit to remove the water produced during the reaction. The mixture was heated up at 260° C. under stirring at 500 RPM under nitrogen bubbling. The polymerization of glycerol was controlled by refractive index. Once the refractive index at 60° C. reached 1.4915 value, the reaction was stopped. The reactor was then put under reduced pressure to remove the lighter fractions, e.g. water, glycerol and diglycerol. Once the distillation completed, the reactor was set back to atmospheric pressure and cooled down.

b. Esterification Reaction Between PG10 and Lauric Acid (C12)

Polyglycerol-10 prepared in Example 1.1.a and lauric acid (Radiacid 0653 from Oleon) with a 77:23 weight ratio were loaded into a reactor equipped with a distillation unit to remove the water produced during the reaction.

The esterification was carried out at 210° C. under stirring at 400 RPM and nitrogen bubbling. The esterification was stopped when the acid value was below 1 mg KOH/g. The reactor was then cooled down.

Characteristics of PG10-C12 thus obtained are described in Table 1.

TABLE 1

Characteristics of PG10-C12

| | Acid value (mg KOH/g) | Hydroxyl value (mg KOH/g) |
|---|---|---|
| PG10-C12 | 0.5 | 342.5 |

2. Preparation of Combinations

Each combination (C) was prepared by mixing PG10-C12 prepared in Example 1.1.b with one of the following alcohol:

- polyethylene glycol 400 (PEG 400): Radia 4917 from Oleon (CAS: 25322-68-3);
- mono propylene glycol (MPG): Radianol 4713 from Oleon;
- n-butyl glycol (BG) from Thermo Scientific.

Chemicals and quantities for each combination are specified in Table 2.

TABLE 2

Content of combinations according to the disclosure

| | C1 (wt %) | C2 (wt %) | C3 (wt %) |
|---|---|---|---|
| PG10-C12 | 62 | 70 | 80 |
| Polyethylene glycol 400 (PEG 400) | 38 | — | — |
| Mono propylene glycol (MPG) | — | 30 | — |
| n-butyl glycol (BG) | — | — | 20 |

EXAMPLE 2: PREPARATION OF FLUIDS ACCORDING TO THE DISCLOSURE

Fluids F1-F3 were prepared by mixing 0.1 wt % of a combination C1, C2 and C3 prepared in Example 1.2 in 99.9 wt % of a brine comprising 5 wt % potassium chloride (KCl) in 95 wt % of deionized water.

Fluids F4-F6 were prepared by mixing 0.1 wt % of a combination C1, C2 and C3 prepared in Example 1.2 in 99.9 wt % of a brine comprising 24 wt % potassium chloride (KCl) in 76 wt % of deionized water.

Fluid F7 was prepared by mixing 0.1 wt % of a combination C1 prepared in Example 1.2 in 99.9 wt % of a brine comprising 26 wt % of sodium chloride (NaCl) in 74 wt % of deionized water.

All combinations C1-C3 were well dispersed in brine at room temperature, e.g. 25° C.+/−5° C.

Table 3 gathers the description of the different fluids prepared.

TABLE 3

| Content of fluids according to the disclosure | | | | | | | |
|---|---|---|---|---|---|---|---|
| | F1 (wt %) | F2 (wt %) | F3 (wt %) | F4 (wt %) | F5 (wt %) | F6 (wt %) | F7 (wt %) |
| C1 | 0.1 | | | 0.1 | | | 0.1 |
| C2 | | 0.1 | | | 0.1 | | |
| C3 | | | 0.1 | | | 0.1 | |
| KCl brine (5 wt %) | 99.9 | 99.9 | 99.9 | | | | |
| KCl brine (24 wt %) | | | | 99.9 | 99.9 | 99.9 | |
| NaCl brine (26 wt %) | | | | | | | 99.9 |

EXAMPLE 3: PREPARATION OF COMPARATIVE FLUIDS

Comparative fluid CF1 was prepared by diluting 0.1 wt % of PG10-C12 in 99.9 wt % of a brine comprising 5 wt % of potassium chloride (KCl) and 95 wt % of deionized water.

Comparative fluid CF2 was prepared by diluting 0.1 wt % of polyglycerol-6 laurate (PG6-C12) in 99.9 wt % of a brine comprising 5 wt % of potassium chloride (KCl) and 95 wt % of deionized water.

PG6 was prepared according to the method described in Example 1.1.a., except that the reaction was stopped when the refractive index at 60° C. reached 1.4869.

PG6-C12 was prepared according to the method described in Example 1.1.b., except that PG10 was replaced by PG6.

Comparative fluid CF3 was prepared by mixing 0.1 wt % of PG10-C12 with 99.9 wt % of a brine comprising 24 wt % potassium chloride (KCl) and 76 wt % of deionized water.

Comparative fluid CF4 was prepared by mixing 0.1 wt % of PG10-C12 with 99.9 wt % of a brine comprising 26 wt % sodium chloride (NaCl) and 74 wt % of deionized water.

EXAMPLE 4: EVALUATION OF THE PROPERTIES OF THE FLUIDS ACCORDING TO THE DISCLOSURE

1. Homogeneity of Fluids at 80° C.

To evaluate the dispersibility of the combinations prepared in Example 1.2 in brines at 80° C. (an example of reservoir temperature) fluids prepared in Example 2 were used.

The fluids were placed in an oven at 80° C. for 72 hours.

The aspects of the fluids were then assessed. A homogeneous system is targeted to consider the combination well dispersed in the brine.

After three days at 80° C., all the fluids remained homogeneous.

The combinations C1, C2 and C3 according to the disclosure are dispersible in different brines even at 80° C. This property makes them therefore suitable for applications requiring their dispersion in brine, even at temperatures higher than 30° C.

2. Interfacial Tension Property

The interfacial tensions (IFT) of the fluids F1-F3 were assessed at 80° C. with the spinning drop tensiometer SDT from Krüss, using the spinning drop method.

The interfacial tension of a blank composition comprising 5 wt % of KCl in 95 wt % deionized water, was also assessed in the same way.

The interfacial tension of comparative fluid CF1 was also measured in the same way.

A value lower than 10 mN/m, preferably comprised between 0.1 and 10 mN/m, is targeted for the present application.

Lowering the IFT is one of the mechanisms for reducing the forces that trap the oil in the rock, making it easier to recover the oil.

Results are gathered in Table 4.

TABLE 4

| Interfacial tension of blank, fluids F1-F3 and CF1 | | | | | |
|---|---|---|---|---|---|
| | Blank | F1 | F2 | F3 | CF1 |
| Interfacial tension at 80° C. (mN/m) | 27.06 | 0.75 | 1.70 | 1.71 | 1.85 |

Fluids F1-F3 present a low interfacial tension, even lower than the interfacial tension of the CF1, which is of 1.85 mN/m.

Those results indicates that combinations C1-C3 can lower the interfacial tension of a brine. The combination according to the disclosure is adapted for releasing oil trapped in rock pores in saline conditions.

3. Wettability Alteration Property

The wettability alteration property is usually evaluated through contact angle measurements on rock surfaces.

In the present case, the reverse of the wettability from oil-wet rock to water-wet rock was evaluated by measuring the contact angles formed by a drop of oil on the surface of rocks immerged in different fluids.

In presence of an oil-wet surface, the drop of oil spreads over the surface of the rock, maximizing the contact with the solid surface, since the affinity between the drop of oil and the rock is high.

In presence of water-wet surface, the drop of oil beads up over the surface of the rock, minimizing the contact with the solid surface, since the affinity between the drop of oil and the rock is low.

Generally, a solid surface is considered water-wet if the contact angle is lower than 75°.

To mimic the reservoir conditions, and have a “oil-wet” rock, clean rocks were first aged in an oil (a light sweet naphthenic crude oil) for ten days at 80° C. under ten bars.

A clean rock is a rock soaked into a mixture of xylene/acetone followed by solvent evaporation at room temperature. This operation is repeated until the xylene/acetone solution is uncolored.

The oil-wet rocks, also named aged rocks, thus obtained were each immerged in a fluid in a sealed container for three days at 80° C.

Then, the rocks were placed each in turn on support in a glass cell, filled with fluid at 80° C.

The oil (light sweet naphthenic crude oil) was injected in the media with a syringe equipped with a J shape needle to drop it under the shale rock.

The efficiency of the fluid to reverse the wettability was evaluated by measuring the contact angle between the rock surface and the drop of oil.

The contact angle measurement was made with the DSA 100 Drop shape Analyzer from Krüss, using the captive drop method.

Each evaluation has been repeated four times per fluid.

a. Shale Rock

F1-F6 and CF1-CF3 were fluids tested with shale rocks (Eagle Ford from Kocurek).

Two blanks were also performed with an aged shale rock immerged in only KCl brine (5 wt % or 24 wt %) for three days at 80° C.

The average of the four measurements and the standard deviation are gathered in Table 5.

TABLE 5

Contact angles formed between an oil drop and the surface of a shale rock.

| | | Average contact angle value | Standard deviation |
|---|---|---|---|
| Blank 1 | KCl brine (5 wt % KCl in water) | 134.30° | 20.79° |
| CF1 | PG10-C12 (0.1 wt % in KCl brine (5 wt %)) | 43.75° | 5.72° |
| CF2 | PG6-C12 (0.1 wt % in KCl brine (5 wt %)) | 139.14° | 12.02° |
| F1 | C1 (0.1 wt % in KCl brine (5 wt %)) | 41.50° | 7.65° |
| F2 | C2 (0.1 wt % in KCl brine (5 wt %)) | 42.33° | 10.05° |
| F3 | C3 (0.1 wt % in KCl brine (5 wt %)) | 32.33° | 5.24° |
| Blank 2 | KCl brine (24 wt % KCl in water) | 133.18° | 9.86° |
| CF2 | PG10-C12 (0.1 wt % in KCl brine (24 wt %)) | 45.00° | 7.54° |
| F4 | C1 (0.1 wt % in KCl brine (24 wt %)) | 39.00° | 5.69° |
| F5 | C2 (0.1 wt % in KCl brine (24 wt %)) | 39.45° | 8.65° |
| F6 | C3 (0.1 wt % in KCl brine (24 wt %)) | 37.53° | 7.56° |

It can be observed that without any surfactant or combination in the brine (Blank 1 and 2) the contact angles are high (respectively 134.30° and) 133.18°, meaning that the drops of oil spread well over the surface of the shale rocks, meaning that the shale rocks are still oil-wet. The immersion of a shale rock in a KCl brine does not change its wettability.

Addition of PG10-C12 to the brine (CF1) changes the wettability of a shale rock when it is immersed in the said brine; the contact angle value being lower than 50°.

On the contrary, the contact angle measured when the shale rock was immersed in a brine comprising PG6-C12 (CF2) stayed high, meaning that PG6-C12 has no effect on the wettability of the shale rock.

The contact angles measured when the shale rock is immersed in a fluid comprising a combination according to the disclosure (F1-F3, F4-F6), are all lower than 50°. This demonstrates a particular good ability of the combination C1-C3 to reverse the wettability of shale rocks from oil-wet to water-wet.

b. Limestone Rocks

F1, F3 and CF1 were fluids tested with limestone rocks (Burlington from Kocurek).

A blank was also performed with an aged limestone rock immerged in only KCl brine (5 wt %) for three days at 80° C.

F7 and CF3 were fluids tested with limestone rocks (Indiana from Kocurek).

With those limestone rocks, aging, imbibition, and contact angle measurements were made at 70° C. instead of 80° C.

A blank was also performed with an aged limestone rock immerged in only NaCl brine (26 wt %) for three days at 70° C.

The average of the four measurements and the standard deviation are gathered in Table 6.

TABLE 6

Contact angles formed between an oil drop and the surface of a limestone rock.

| | | Average contact angle value | Standard deviation |
|---|---|---|---|
| Blank 1 | KCl brine (5 wt % KCl in water) | 132.30° | 18.71° |
| CF1 | PG10-C12 (0.1 wt % in KCl brine (5 wt %)) | 48.65° | 3.10° |
| F1 | C1 (0.1 wt % in KCl brine (5 wt %)) | 48.83° | 5.26° |
| F3 | C3 (0.1 wt % in KCl brine (5 wt %)) | 48.40° | 9.53° |
| Blank 3 | NaCl brine (26 wt % NaCl in water) | 122.15° | 16.63° |
| CF3 | PG10-C12 (0.1 wt % in NaCl brine (26 wt %)) | 52.00° | 4.70° |
| F7 | C1 (0.1 wt % in NaCl brine (26 wt %)) | 48.65° | 4.12° |

Without any surfactant or combination in the brine (Blank 1 and Blank 3) the contact angles are high (132.30° and 122.5° respectively), meaning that the drops of oil spread well over the surface of the limestone rocks, meaning that the limestone rocks are still oil-wet. The immersion of a limestone rock in a KCl or NaCl brine does not change its wettability.

The contact angles measured when the limestone rock is immersed in a fluid comprising a combination according to the disclosure (F1, F3, F7) are lower than 50°. This demonstrates a particular good ability of the combinations C1 and C3 to reverse the wettability of limestone rocks from oil-wet to water-wet.

4. Compatibility in Presence of Additives

To evaluate the compatibility of the combinations prepared in Example 1.2 with additives in a brine, fluids F1-F3 prepared in Example 2 and comparative fluid CF1 prepared in Example 3 were used.

0.10 wt % of a friction reducer (polyacrylamide, Flojet DRP 5151 X from SNF), and 0.05 wt % of a scale inhibitor (ethylene glycol, Radia 4911 from Oleon, CAS 107-21-1) were added to the different fluids, weight percentages being based on the weight of each fluid.

The fluids were placed in an oven at 80° C. for 72 hours.

The aspect of each fluid was then assessed. A homogeneous system is targeted to consider the combination compatible with additives.

After three days, fluids F1-F3 remained homogeneous. On contrary, the comparative fluid CF1 was heterogeneous, with a separation of PG10-C12 from its medium.

It can be concluded that the addition of polyethylene glycol 400, mono propylene glycol, or n-butyl glycol to PG10-C12, improves the compatibility of PG10-C12 with additives in saline conditions, in particular with friction reducer and scale inhibitor additives.

The invention claimed is:

1. A combination consisting of:

50-99 wt % of polyglycerol-10 laurate; and 1-50 wt % of an alcohol of Formula (I):

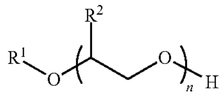

(I)

wherein:

$R^1$ and $R^2$, identical or different, each represents a hydrogen atom or a saturated, linear or branched, alkyl group comprising from 1 to 4 carbon atoms; and n is an integer comprised between 1 and 10;

weight percentages being based on the weight of the combination.

2. The combination according to claim 1, wherein, in the alcohol of Formula (I), $R^2$ represents a hydrogen atom or a methyl group.

3. The combination according to claim 1, wherein, in the alcohol of Formula (I), $R^1$ represents a hydrogen atom or a butyl group.

4. The combination according to claim 1, wherein the alcohol of Formula (I) is selected from polyethylene glycol 400, monopropylene glycol, and/or butyl glycol.

5. The combination according to claim 1, wherein the polyglycerol-10 laurate represents 55-85 wt %, and the alcohol of Formula (I) represents 15-45 wt %, weight percentages being based on the weight of the combination.

6. A fluid comprising:

at least 0.05 wt % of the combination according to claim 1; and at least 97 wt % of brine;

weight percentages being based on the weight of the fluid.

7. The fluid according to claim 6, wherein the combination represents between 0.05 and 3 wt % of the weight of the fluid.

8. The fluid according to claim 6, wherein the brine represents between 97 and 99.95 wt % of the weight of the fluid.

9. The fluid according to claim 6, further comprising an additive, wherein the additive represents between 0.01 and 2 wt % of the weight of the fluid.

10. A method for releasing oil from an oil reservoir, comprising introducing the fluid according to claim 6, through a wellbore into the said oil reservoir.

* * * * *